United States Patent [19]

Matsuno

[11] 4,350,544
[45] Sep. 21, 1982

[54] METHOD OF MANUFACTURING A PADDED PANEL

[75] Inventor: Yoshio Matsuno, Yokohama, Japan

[73] Assignee: Nissan Motor Co., Ltd., Yokohama, Japan

[21] Appl. No.: 190,224

[22] Filed: Sep. 24, 1980

[30] Foreign Application Priority Data

Sep. 28, 1979 [JP] Japan .................................. 54-126030

[51] Int. Cl.³ ............................................. B32B 31/06
[52] U.S. Cl. ..................................... 156/79; 52/309.11; 156/82; 156/267; 156/290; 156/291; 264/46.5; 264/DIG. 83; 428/71; 428/138; 428/304.4; 428/317.1; 428/322.7
[58] Field of Search ........................ 52/309.9, 309.11; 156/79, 250, 267, 82, 290, 291; 264/46.6, 46.5, DIG. 83; 428/71, 138, 304.4, 317.1, 322.7

[56] References Cited

U.S. PATENT DOCUMENTS

| | | | |
|---|---|---|---|
| 2,672,176 | 3/1954 | Lyisynen | 156/581 |
| 2,710,046 | 6/1955 | Markus et al. | 156/581 X |
| 3,772,111 | 11/1973 | Ginsburg | 156/79 |
| 4,244,764 | 1/1981 | Ginsburg | 156/78 |
| 4,248,646 | 2/1981 | Ginsburg | 156/78 |

*Primary Examiner*—Edward C. Kimlin
*Assistant Examiner*—Robert A. Dawson
*Attorney, Agent, or Firm*—Lane, Aitken, Kice & Kananen

[57] ABSTRACT

A padded panel for a vehicle dashboard, console box or the like has an opening for mounting a desired article, such as an instrument, a switch, etc. The panel includes a base plate which is formed with a closed loop groove. A portion of a surface layer, which covers the base plate, is adhered to the surface of the groove to define a completely closed space therebetween. Foamable material is injected into the closed space and caused to foam and harden to form the pad. After completion of hardening of the pad, the base plate and the surface layer are cut along the inner periphery of the groove to form the opening. The bottom surface of the groove affords a seat to accurately position and positively mount the desired article.

1 Claim, 4 Drawing Figures

METHOD OF MANUFACTURING A PADDED PANEL

BACKGROUND OF THE INVENTION

The present invention relates to a padded panel of a vehicle dashboard, console box or the like, which is formed with an opening for mounting a desired article, such as an instrument, a switch, etc. The present invention relates also to a method of manufacturing such a panel.

Conventionally, as shown in FIG. 1, such a panel includes a base plate 11 having an opening 13 whose contour conforms with that of the article to be mounted. A surface layer 12 is prepared by vacuum molding plastics material, e.g. polyvinyl chloride, and covers the base plate 11 with a space therebetween. The surface layer 12 on its outer periphery is adhered to, or in close contact with the surface of the base plate. Subsequently, a seal member 14 is superimposed on the periphery of the opening 13 at the opposite side of the surface layer 12, and substantially seals the space between the base plate 11 and the surface layer 12. Foamable material 15, such as urethane, is injected into the space and foamed therein. After completion of hardening of thus foamed material 15, the seal member 14 is removed, and the surface layer 12 and the foamed material 15 are cut away along the periphery of the opening 13. Thus a panel having a resilient pad is manufactured, which is formed with a complete opening 16 for mounting the desired article.

The above described process is disadvantageous in that, as the base plate 11 is not rigid enough against the foaming pressure, the base plate 11 is liable to deform during the foaming period. Thus, gaps are formed between the base plate 11 and the seal member 14, so that a substantial amount of foamable material (about 200 to 300 grams per one foaming operation) leaks away through the gaps. Such a loss of the material cannot be considered negligible, and makes it difficult to reduce the manufacturing cost.

Furthermore, with the padded panel thus manufactured, the connection between the foamed material and the surface layer is exposed on the peripheral wall of the opening 16 so that the surface layer 12 might be relatively easily separated from the pad without a careful mounting operation.

SUMMARY OF THE INVENTION

Therefore, it is an object of the present invention to provide an improved padded panel which can be manufactured without accompanying unnecessary material loss, and in which the separation of the surface layer is effectively prevented.

Another object of the present invention is to provide an improved method of manufacturing such a padded panel, which can be easily carried out and which prevents undesirable leakage of the foamable material without using a separate seal member.

Briefly stated, according to the present invention, the base plate is formed with a groove in the form of a closed loop. A surface layer is adhered on the surface of the groove and defines a completely closed space between the surface layer and the base plate. Foamable material is injected into the closed space and foamed therein. After hardening of the foamed material is completed, the surface layer and the base plate are cut along the inner periphery of the closed loop groove. Since the opening in the base plate is formed only after the molding of the pad, leakage of the foamable material can be completely eliminated without using a separate seal member.

The present invention will now be explained more in detail by referring to one preferred embodiment shown in the accompanying drawings.

DESCRIPTION OF THE PREFERRED EMBODIMENT

Figure 1:
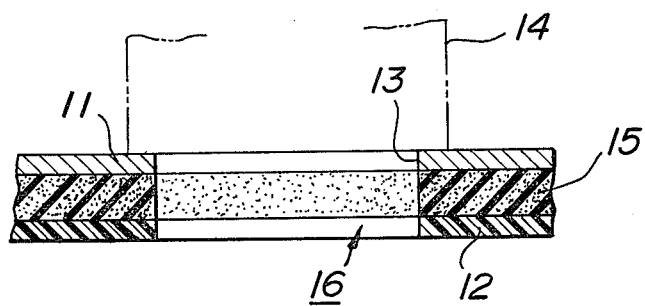
FIG. 1 is a sectional view showing the above-mentioned conventional padded panel.
Figure 2:
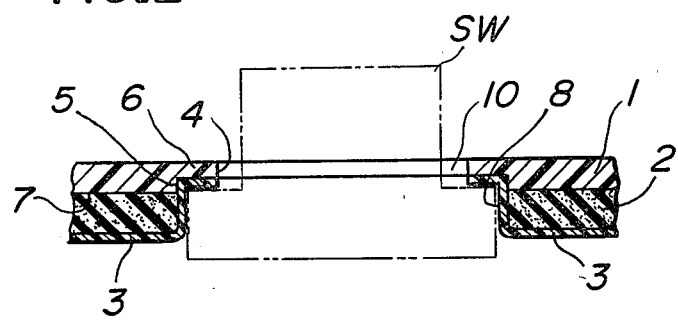
FIG. 2 is a sectional view, similar to FIG. 1, but showing the padded panel according to one embodiment of the present invention.

Referring now to FIG. 2, there is shown a padded panel according to one preferred embodiment of the present invention, which comprises a base plate 1 consisting of suitable plastics material, for example. The base plate 1 has an opening 10 surrounded by a thin-walled peripheral portion 6 which is connected through a stepped portion 5 with the general surface 7 of the base plate 1. A resilient pad 2 made of foamed plastics material, such as urethane, covers the surface 7 of the base plate 1, leaving an opening 8 which is contiguous with the opening 10 in the base plate 1. The edge of the opening 8 is aligned with the stepped portion 5. A surface layer 3 covers the outer surface of the pad 2 and the inner peripheral wall of the opening 8, and is adhered to the thin-walled peripheral portion 6 of the base plate 1. The openings 8 and 10 permit a desired article, such as a switch SW, to be mounted on the panel.

Figure 3:
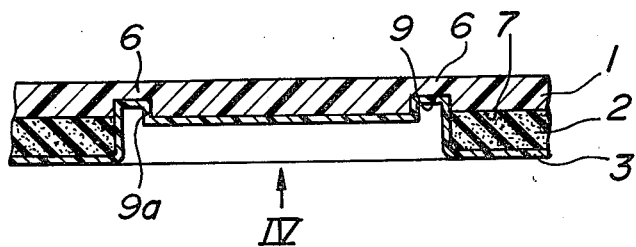
FIG. 3 is a sectional view of the padded panel of FIG. 2, which is not yet formed with the opening.
Figure 4:
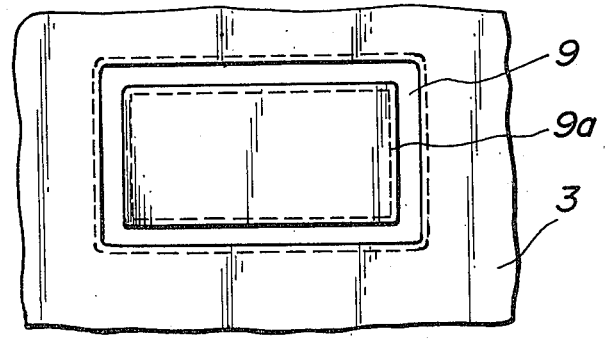
FIG. 4 is a plan view of the padded panel seen in the direction of the arrow IV in FIG. 3.

According to the present invention, the padded panel as shown in FIG. 2 is manufactured in the following manner. Referring to FIGS. 3 and 4, the base plate 1 on its outer side surface 7 is formed with a groove 9 in the form of a closed loop. Thus at the location of the groove 9, the base plate has a reduced thickness or the thin-walled portion 6. After the thin-walled portion 6 is processed by a flame treatment, or is applied with adhesive agent, a portion of the surface layer 3 is pressed against the surface of the groove 9 and adhered thereto. The outer periphery of the surface layer 3 is also adhered to the surface 7 of the base plate 1. By this, a completely closed space is formed between the base plate 1 and the surface layer 3. Subsequently, foamable urethane material is injected into the closed space between the base plate 1 and the surface layer 3, and is foamed to provide the pad 2. After completion of the foaming and hardening of the pad 2, the base plate 1 and the surface layer 3 are cut along the inner periphery 9a of the groove 9, as shown in FIG. 4, also, to form the opening 10.

As mentioned above, when the surface layer 3 is adhered to the base plate 1 but the pad 2 is not yet formed, the space between the base plate 1 and the surface layer 3 is completely closed and sealed by them. Thus, leakage of the foamable material can be completely eliminated without using unsatisfactory sealing members during the foaming. Consequently, the padded panel can be manufactured in a very simple and facilitated manner, and the material cost is minimized.

With the padded panel thus manufactured, the thin-walled portion 6 serves to accurately position and positively mount the desired article. Otherwise, such an article is positioned with respect to the base plate 1 with the resilient pad 2 therebetween so that a positive and accurate positioning can never be achieved. Furthermore, according to the present invention, the inner peripheral wall of the opening 8 is completely covered by the surface layer 3 so that the connection between the pad 2 and the surface layer 3 is not exposed. Thus, separation of the surface layer 3 from the pad 2 is positively prevented and the refined appearance is effectively maintained. In order to obtain an accurate dimension of the opening 10, it may be formed by a press operation.

What is claimed is:

1. A method of manufacturing a padded panel having an opening for mounting a desired article on the panel, comprising the steps of:

forming a groove in the form of a closed loop on a surface of a relatively thick and rigid base plate to form a thin-walled portion around the periphery of said closed loop;

adhering a portion of a relatively thin and flexible surface layer with the surface of the groove, thus forming a closed space between the base plate and the surface layer;

injecting foamable plastics material into the closed space, and causing the foamable plastics material to foam and harden in the closed space; and cutting the base plate and the surface layer along the inner periphery of the groove, to thereby form the opening of the panel, while leaving the bottom of the groove as a thin-walled portion around the opening, which affords a seat for positioning and mounting the desired article.

* * * * *